United States Patent
Nagashima et al.

(10) Patent No.: US 10,282,828 B2
(45) Date of Patent: May 7, 2019

(54) IMAGE PROCESSING APPARATUS TO CONVERT GRADATION VALUES OF AN INPUT IMAGE, CONTROL METHOD THEREOF, AND PROGRAM

(71) Applicant: CANON KABUSHIKI KAISHA, Tokyo (JP)

(72) Inventors: Yoshiyuki Nagashima, Kawasaki (JP); Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/467,965

(22) Filed: Mar. 23, 2017

(65) Prior Publication Data
US 2017/0287121 A1  Oct. 5, 2017

(30) Foreign Application Priority Data
Mar. 31, 2016 (JP) ................. 2016-072974

(51) Int. Cl.
*G06T 5/00* (2006.01)
*H04N 1/409* (2006.01)
*H04N 5/77* (2006.01)
*H04N 9/79* (2006.01)

(52) U.S. Cl.
CPC .......... *G06T 5/007* (2013.01); *H04N 1/4092* (2013.01); *H04N 5/77* (2013.01); *H04N 9/79* (2013.01); *G06T 2207/20192* (2013.01); *G06T 2207/20208* (2013.01)

(58) Field of Classification Search
CPC ................. G06T 5/007; G06T 2207/20208
See application file for complete search history.

(56) References Cited

U.S. PATENT DOCUMENTS

| | | | |
|---|---|---|---|
| 2004/0160439 A1* | 8/2004 | Xavier | G06T 3/403 345/419 |
| 2004/0170338 A1* | 9/2004 | Maurer | G06T 5/008 382/260 |
| 2005/0069217 A1* | 3/2005 | Mukherjee | G06T 5/004 382/266 |
| 2006/0050928 A1* | 3/2006 | Ogawa | G06K 9/4609 382/103 |
| 2006/0170940 A1* | 8/2006 | Kang | H04N 1/6058 358/1.9 |

(Continued)

FOREIGN PATENT DOCUMENTS

JP   2001008065 A   1/2001

*Primary Examiner* — Ming Y Hon
(74) *Attorney, Agent, or Firm* — Canon USA, Inc. IP Division

(57) ABSTRACT

An image processing apparatus includes a setting unit and a conversion unit. The setting unit sets a gradation threshold. The conversion unit converts a gradation value greater than the gradation threshold in an input image into a predetermined gradation value, converts a gradation value equal to or less than the gradation threshold in the input image into a gradation value equal to or less than the predetermined gradation value, and generates an output image. In a case where the input image is an image processed in such a manner as to enhance a predetermined area, the setting unit sets the gradation threshold such that a surrounding area of the predetermined area of the input image becomes equal to or less than the gradation threshold.

13 Claims, 13 Drawing Sheets

(56) References Cited

U.S. PATENT DOCUMENTS

| | | | | |
|---|---|---|---|---|
| 2009/0251487 A1* | 10/2009 | Chiang | ............... | G09G 5/02 |
| | | | | 345/604 |
| 2010/0329559 A1* | 12/2010 | Shindo | ............... | G06T 5/009 |
| | | | | 382/172 |
| 2011/0085738 A1* | 4/2011 | Kitamura | ............ | G06T 5/002 |
| | | | | 382/199 |
| 2014/0204246 A1* | 7/2014 | Nishi | ............. | H04N 5/2355 |
| | | | | 348/239 |
| 2015/0256719 A1* | 9/2015 | Bishop | ............ | H04N 1/6058 |
| | | | | 382/167 |
| 2015/0358646 A1* | 12/2015 | Mertens | .......... | H04N 1/6058 |
| | | | | 382/166 |
| 2016/0027189 A1* | 1/2016 | Lin | .................... | G06T 7/408 |
| | | | | 382/167 |
| 2016/0275913 A1* | 9/2016 | Nagashima | ......... | G06T 5/009 |
| 2017/0061595 A1* | 3/2017 | Suzuki | ................. | G06T 5/40 |

\* cited by examiner

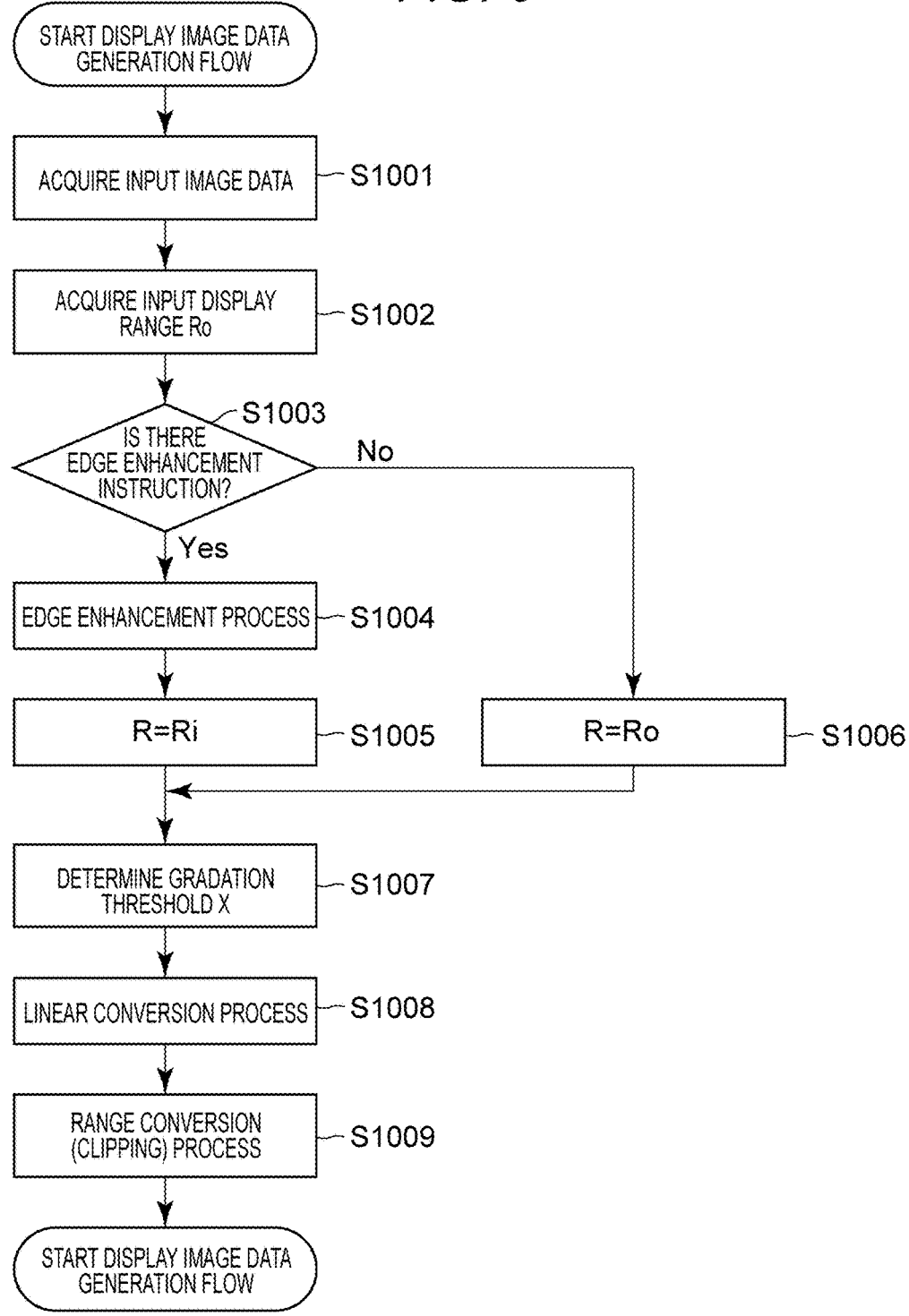

IMAGE PROCESSING APPARATUS TO CONVERT GRADATION VALUES OF AN INPUT IMAGE, CONTROL METHOD THEREOF, AND PROGRAM

BACKGROUND OF THE INVENTION

Field of the Invention

The present disclosure relates to an image processing apparatus that generates an image where an edge has been enhanced.

Description of the Related Art

There is an imaging apparatus that uses a gradation characteristic where a gradation value is assigned to a wider luminance range (dynamic range) than a known one to generate an image corresponding to a high luminance input.

On the other hand, some display apparatuses cannot produce a high luminance representation appropriate to the wide dynamic range. In such display apparatuses, a gradation value in an input image, the gradation value being greater than a gradation value corresponding to a set upper luminance limit, may be converted into a predetermined gradation value (a clipping process). Furthermore, a gradation value corresponding to a luminance equal to or less than the set upper luminance limit may be converted into a range equal to or less than the predetermined gradation value. Consequently, a pixel having a gradation value smaller than the set upper luminance limit within the dynamic range in the input image is represented, in a display image, at a luminance close to a luminance appropriate to the wide dynamic range of the input image.

Moreover, in a display apparatus that is connected to an imaging apparatus to display an image being captured, an edge in the image is checked to find the focus of the imaging apparatus. Japanese Patent Laid-Open No. 2001-008065 describes an image processing method where an edge area of an image displayed on a display apparatus is enhanced and displayed to improve visibility and identifiability that indicate on which object image the focus is placed in the image.

SUMMARY OF THE INVENTION

According to an aspect of the present invention, an image processing apparatus includes a setting unit configured to set a gradation threshold, and a conversion unit configured to convert a gradation value greater than the gradation threshold in an input image into a predetermined gradation value, convert a gradation value equal to or less than the gradation threshold in the input image into a gradation value equal to or less than the predetermined gradation value, and generate an output image, wherein, in a case where the input image is an image processed in such a manner as to enhance a predetermined area, the setting unit sets the gradation threshold such that a surrounding area of the predetermined area of the input image becomes equal to or less than the gradation threshold.

Further features of the present invention will become apparent from the following description of embodiments (with reference to the attached drawings).

BRIEF DESCRIPTION OF THE DRAWINGS

FIG. 6 is a first flowchart illustrating the display image generation flow of a range setting unit.

DESCRIPTION OF THE EMBODIMENTS

Figure 1:
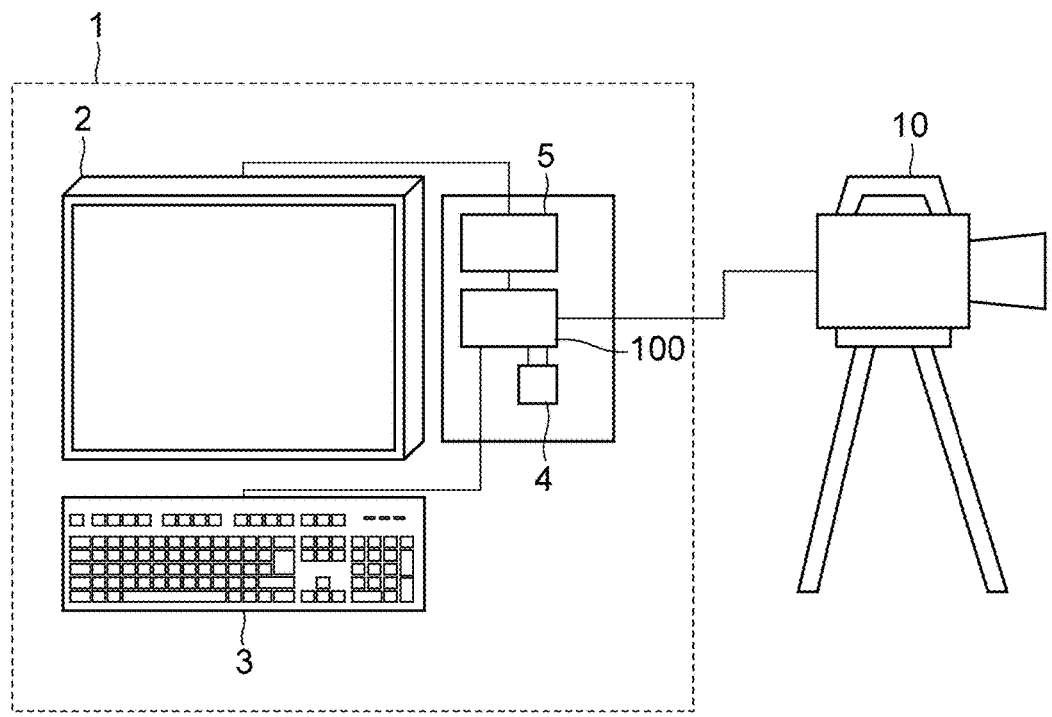
FIG. 1 is an apparatus configuration diagram illustrating a display apparatus in a first example.

An embodiment of the present disclosure is described hereinafter with reference to the drawings. The technical scope of the present disclosure is determined by the claims, and is not limited by examples exemplified below. Moreover, the present disclosure does not necessarily require all combinations of features described in the examples. The contents of the descriptions in the specification and the drawings are exemplifications, and are not intended to restrict the present disclosure. Various modifications (including organic combinations of the examples) are feasible based on the purport of the present disclosure, and are not intended to be excluded from the scope of the present disclosure. In other words, the present disclosure also includes all combined configurations of the examples and modifications thereof.

First Example

A display apparatus 1 described in a first example includes an image processing apparatus that converts an input image on which an edge enhancement process has been performed, in accordance with a display luminance range (display range) specified by a user, to generate an output image, and displays an image using the generated output image.

Image data having a plurality of pixels for each of which a gradation value is specified includes image data to be recorded in a data format in which a gradation value is associated with a display luminance at which the image data is displayed on the display apparatus. The display luminance here may indicate absolute luminance in a case where the image data is displayed on the display apparatus, or may relatively indicate the intensity of light such as reflectance. It is assumed that, for example, reflectance is associated with each gradation value of the input image. "Reflectance" is one representation form of the brightness of an image, and is a value that represents the brightness of a light-receiving object illuminated under environment light as a reflectance of the order of 0 to 100%, and the brightness of a light-emitting object such as an illuminating light source and the sun, which has brightness exceeding the brightness of the light-emitting object, as a reflectance of 100% or more.

Examples of the data format where a gradation value and a display luminance at which image data is displayed on the display apparatus are associated include the Cineon log format based on the characteristics of a film.

When the display apparatus 1 displays an image using image data recorded in the data format where reflectance is associated with a gradation value, the display luminance of each pixel is determined based on a display luminance characteristic where the display luminance and the reflectance of the display apparatus 1 are associated. The display luminance characteristic of the display apparatus 1 is assumed that, for example, the display luminance corresponds linearly to the reflectance. Moreover, let a display luminance corresponding to a reflectance of 1000% be 1000 cd/m2.

A display luminance range corresponding to a gradation value range of an input image is assumed below to be the dynamic range of the input image. Moreover, a display luminance range of an output image is similarly assumed to be the dynamic range of the output image.

Moreover, there is a display apparatus that can generate an output image by converting the dynamic range of an input image in accordance with a display range specified by a user. If the user sets the display range at, for example, 0 to 400 cd/m2, the display apparatus 1 generates an output image in such a manner as to set, as the dynamic range of the output image, a range corresponding to a reflectance of 400% or less within the dynamic range of an input image.

One of the dynamic range conversion processes to be executed by the display apparatus 1 is a clipping process. The clipping process is effective when the range of displayable luminance of the display apparatus is narrower than a display luminance range (dynamic range) specified in the input image. The user specifies the range of displayable luminance of the display apparatus 1 as the display range; accordingly it becomes possible to faithfully reproduce and display the luminance of a pixel, in the input image, whose specified display luminance is within the display range.

The display apparatus 1 is a display apparatus including an image processing apparatus that can perform the above-mentioned clipping process on an input image on which the edge enhancement process has been performed.

FIG. 1 is an apparatus configuration diagram illustrating the display apparatus 1 in the first example. The display apparatus 1 is connected to a camera 10. The display apparatus 1 includes a display 2, an operating unit 3, a memory 4, a display control board 5, and an image processing board 100.

The display 2 is a liquid crystal display that uses an image input from the camera 10 and displays the image on a screen. The display 2 includes a liquid crystal panel having a plurality of liquid crystal elements that can control transmittance separately, and a backlight that irradiates the liquid crystal panel with light. The transmittance of each liquid crystal element of the liquid crystal panel and the luminance of the backlight are controlled by the display control board 5. The display 2 is, for example, a display that can display at up to 400 cd/m2.

The display 2 may not be a transmission display that transmits light and displays an image as in the liquid crystal display. The display 2 may be a self-emitting display such as an Organic Light-Emitting Diode (OLED) display where light emitting elements using an OLED are arranged in a matrix.

The operating unit 3 is an input device into which the user inputs instructions to control the operations of the display apparatus 1. The operating unit 3 is, for example, a keyboard and a mouse. The operating unit 3 is a user interface where the user can input, into the display apparatus 1, information that specifies the display range or a gradation threshold, information that specifies whether or not to execute the edge enhancement process, and the like by operating the operating unit 3. The operating unit 3 can also input each piece of information by operating a Graphical User Interface (GUI) displayed on the display 2.

The memory 4 is a storage medium where programs, parameters, and the like that are used by the display control board 5 and the image processing board 100 to execute processes described below are stored. The memory 4 is a storage medium that allows a calculation processing unit such as a processor to read and write data from and into it. The memory 4 is a non-volatile storage medium such as a hard disk and a volatile storage medium such as a semiconductor memory.

The display control board 5 is a circuit board including a control circuit that controls the display 2 using an output image generated by the image processing board 100 described below. The display control board 5 includes a processor and an electronic circuit, and controls the liquid crystal panel and the backlight of the display 2 using a display image (output image).

The image processing board 100 is an image processing apparatus that generates an output image using an input image. The input image is image data where a gradation value is specified in a predetermined number of input bits for each of a plurality of pixels. Let the predetermined number of input bits be, for example, 10 bits. Moreover, the output image is image data where a gradation value is specified in a predetermined number of output bits for each of a plurality of pixels. Let the predetermined number of output bits be, for example, 10 bits, the same as the number of input bits. The number of input bits and the number of output bits may be different.

The image processing board 100 includes a calculation processing unit (processor) and an electronic circuit. The image processing board 100 performs the clipping process of converting a gradation value greater than a gradation threshold in accordance with the display range in the input image into a predetermined gradation value, and converting a gradation value equal to or less than the gradation threshold in the input image into a gradation value range equal to or less than the predetermined gradation value, and generates an output image. The predetermined gradation value is, for example, a gradation value corresponding to a maximum possible gradation value of the output image.

With the above-mentioned processing, a pixel with a gradation value appropriate to the display range in the input image is displayed on the display 2 at a luminance close to the display luminance specified in the input image. To put it another way, it also can be said that the image processing board 100 performs a gradation conversion process such that the brightness range of the input image appropriate to the display range specified by the user can obtain, in the output image, a gradation characteristic closer to the gradation characteristic of the input image than the other ranges.

Moreover, the image processing board 100 performs the edge enhancement process on an edge area of the input image when the user has instructed to execute the edge enhancement process. Furthermore, the image processing board 100 sets the gradation threshold such that at least a gradation value of a surrounding area of the edge area becomes equal to or less than the gradation threshold when the execution of the edge enhancement process has been instructed. Consequently, clipping is prevented from occurring in the surrounding area of the edge area in the image.

The camera 10 is an imaging apparatus that outputs an image taken to the display apparatus 1. In the first example, the camera 10 outputs an image where a gradation value obtained by associating a 10-bit gradation value with the brightness of incident light is specified for each pixel arranged in a matrix.

Figure 2:
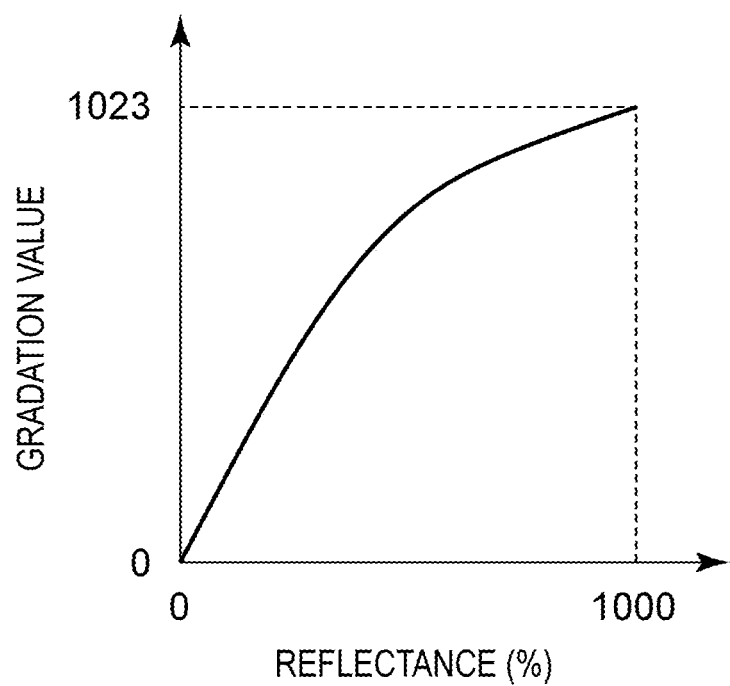
FIG. 2 is a schematic diagram illustrating a relationship between the brightness and the gradation value of an image output by a camera.

FIG. 2 is a schematic diagram illustrating a relationship between the gradation value and the brightness of an image output by the camera 10. The camera 10 outputs, to the display apparatus 1, an input image where a gradation value corresponding to reflectance in accordance with the amount of light incident on each pixel is specified. In terms of the image output by the camera 10, a gradation value may be associated with a luminance value expressed in nit or cd/m2. For example, the camera 10 outputs an input image where a gradation value is associated with a reflectance range of 0 to 1000%. As illustrated in FIG. 2, the camera 10 is assumed to associate the reflectance with the gradation value using a logarithmic curve. In other words, it can be said that the image output from the camera 10 has a logarithmic gradation characteristic (gamma characteristic).

An image where a gradation value is associated with a wide luminance range (dynamic range) is called an HDR signal. The camera 10 outputs the HDR signal to the image processing board 100 of the display apparatus 1.

Figure 3:
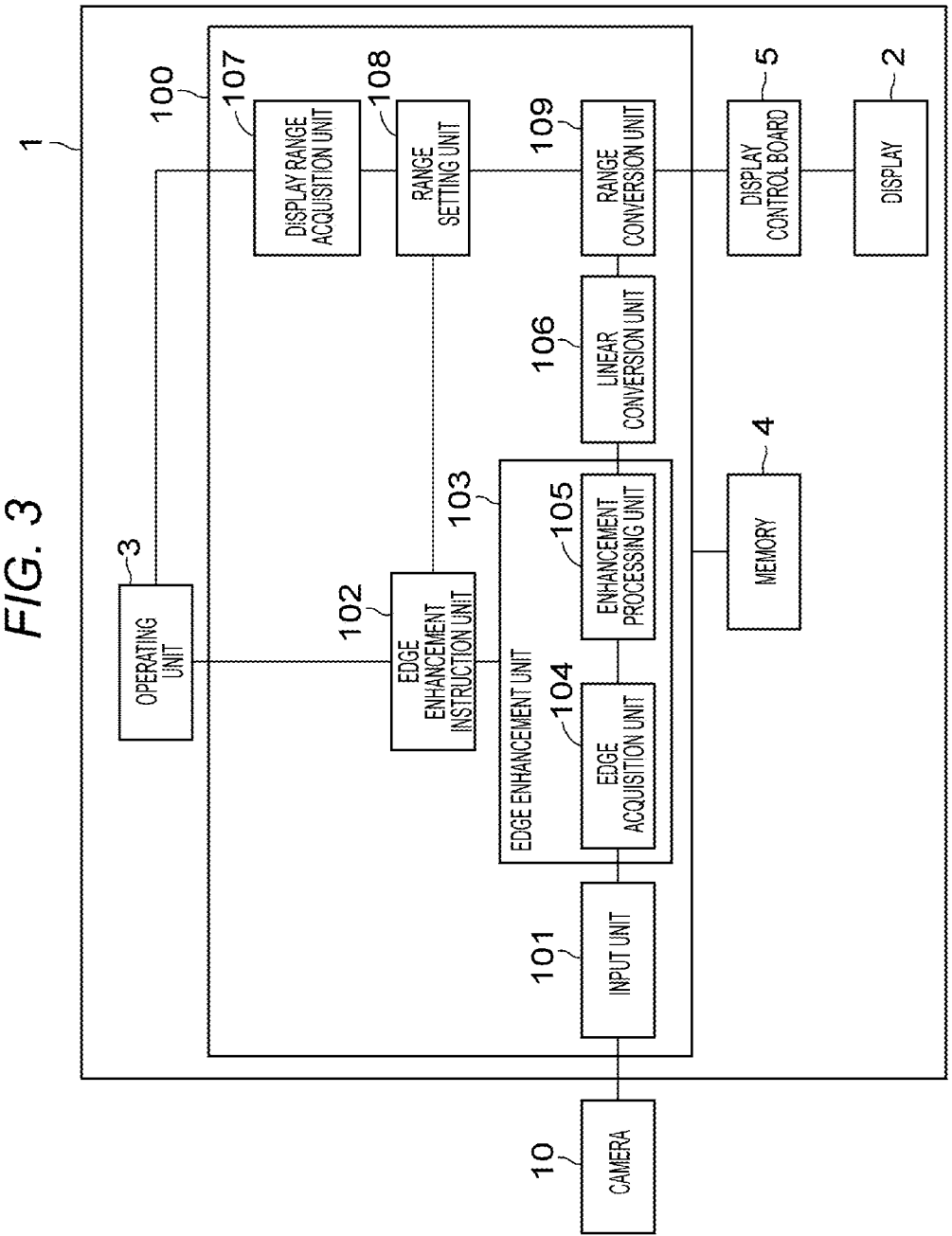
FIG. 3 is a block diagram illustrating function blocks of the display apparatus and the camera in the first example.

FIG. 3 is a block diagram illustrating function blocks of the display apparatus 1 and the camera 10. The image processing board 100 includes an input unit 101, an edge enhancement instruction unit 102, an edge enhancement unit 103, a linear conversion unit 106, a display range acquisition unit 107, a range setting unit 108, and a range conversion unit 109. In terms of the image processing board 100, part or all of functions of the function blocks included in the image processing board 100 also can be implemented by electronic circuits, or may be executed by a processor using programs read from the memory 4.

The input unit 101 is an interface that is connected to the camera 10 and acquires an input image from the camera 10. The input unit 101 is an input interface supporting specifications of, for example, the Digital Visual Interface (DVI) and the High-Definition Multimedia Interface (HDMI (registered trademark)). Moreover, the input unit 101 may be a receiving interface that can receive signals pursuant to wireless communication standards such as Wireless Fidelity (Wi-Fi) and Bluetooth (registered trademark). Moreover, the input unit 101 may have a function of converting an input or received signal into a signal format that can be processed by the image processing board 100. The input unit 101 outputs the input image to the edge enhancement unit 103.

The edge enhancement instruction unit 102 outputs an instruction indicating whether or not to execute the edge enhancement process, to the edge enhancement unit 103 and the range setting unit 108, using the information input from the operating unit 3, the information indicating whether or not to execute the edge enhancement process.

The edge enhancement unit 103 performs the edge enhancement process on the input image, and executes a process that makes an edge area more visible. Consequently, it becomes easier for the user to recognize the position on which the focus of the camera 10 is placed. When the instruction to execute the edge enhancement process has been input from the edge enhancement instruction unit 102, the edge enhancement unit 103 performs the edge enhancement process on the input image and outputs the input image to the linear conversion unit 106. Moreover, when the instruction not to execute the edge enhancement process has been input from the edge enhancement instruction unit 102, the edge enhancement unit 103 outputs the input image to the linear conversion unit 106. The edge enhancement unit 103 includes an edge acquisition unit 104 and an enhancement processing unit 105.

The edge acquisition unit 104 identifies the edge area of the input image. The edge acquisition unit 104 performs a process of applying, to the input image, a high-pass filter that passes a spatially high-frequency region and acquires the edge area. The edge acquisition unit 104 may identify the edge area by, for example, a differentiation process. The edge acquisition unit 104 outputs the input image and information on the edge area to the enhancement processing unit 105. The information on the edge area is, for example, position information on an area set as the edge area in the input image.

The enhancement processing unit 105 performs the enhancement process on the edge area of the input image. The enhancement process is, for example, an enhancement process that colors the edge area in a predetermined color. The enhancement processing unit 105 performs the enhancement process on the edge area in such a manner as to represent the edge area at a luminance included in the display range specified by the user. The enhancement processing unit 105 may perform a process of increasing luminance or an emboldening process on the edge area. The enhancement processing unit 105 outputs, to the linear conversion unit 106, the input image having the edge area on which the enhancement process has been performed.

Figure 4A:
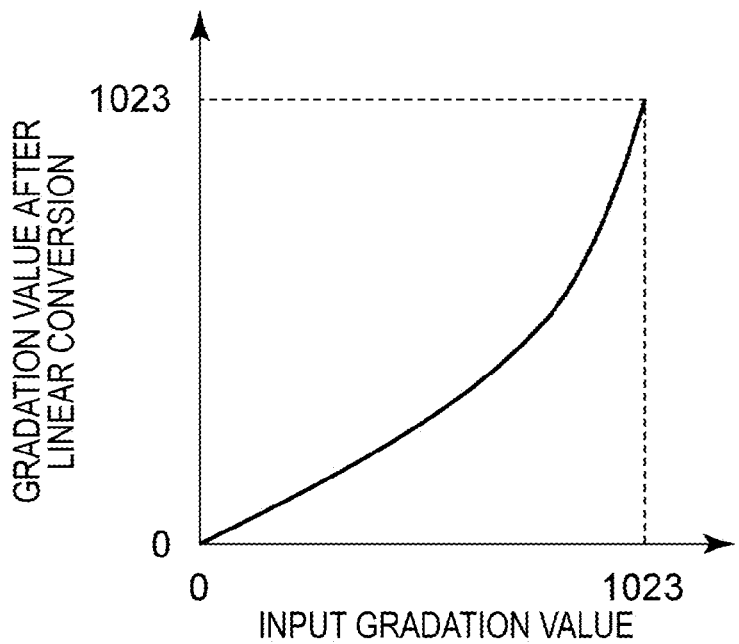
FIGS. 4A and 4B are schematic diagrams illustrating an LUT used by a linear conversion unit for a conversion process, and a relationship of the gradation value after conversion with reflectance.
Figure 4B:
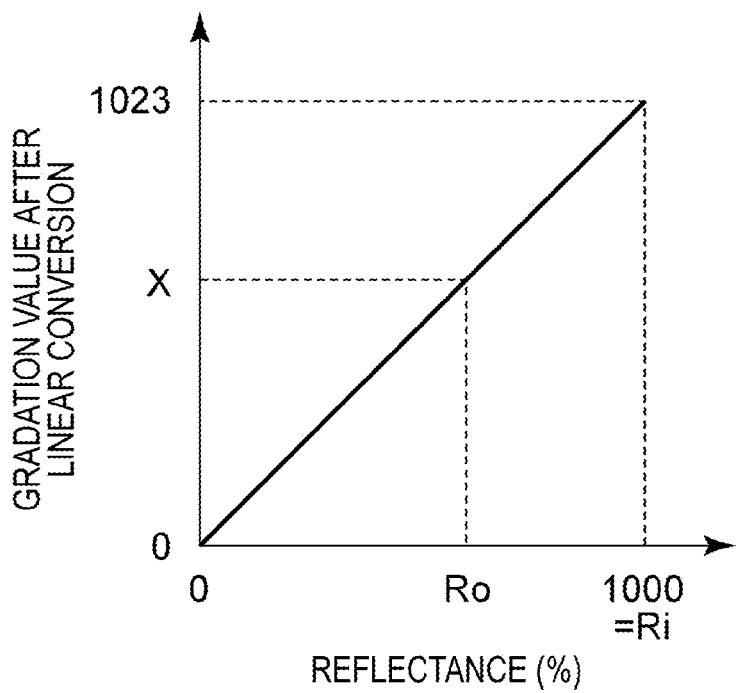

The linear conversion unit 106 performs a conversion process of making the gradation characteristic linear on the input image input from the edge enhancement unit 103. FIGS. 4A and 4B are schematic diagrams illustrating a Look Up Table (LUT) used by the linear conversion unit 106 for the conversion process, and a relationship of the gradation value after the conversion with the reflectance. FIG. 4A is a schematic diagram illustrating the LUT used by the linear conversion unit 106 for the conversion process. The linear conversion unit 106 linearly converts the gradation characteristic of the input image acquired from the camera 10, using the above-mentioned LUT. In other words, it can be said that the linear conversion unit 106 performs an inverse gamma conversion process on the input image.

FIG. 4B is a schematic diagram illustrating the gradation characteristic that is the relationship between the reflectance and the gradation value in the image after the gradation conversion. With the gradation conversion process of the linear conversion unit 106, the gradation value is linearly associated with the reflectance. In other words, it can be said that the gradation characteristic of the input image after the gradation conversion is linear. The linear conversion unit 106 outputs, to the range conversion unit 109, the input image on which the gradation conversion process has been performed.

The display range acquisition unit 107 acquires a range input value Ro from the operating unit 3. The user operates the operating unit 3 to input the range input value Ro into the display range acquisition unit 107. The range input value Ro is indicated by reflectance. The range input value Ro can be freely set by the user within the dynamic range appropriate to the input image. For example, an upper luminance limit (400 cd/m2) that can be displayed by the display 2 is set as the range input value Ro. The display range acquisition unit 107 outputs the range input value Ro to the range setting unit 108.

The range setting unit 108 determines a range setting value R in accordance with the information on whether or not to execute the edge enhancement process, and sets a gradation threshold X for the range conversion unit 109. When having acquired the information indicating not to execute the edge enhancement process from the edge enhancement instruction unit 102, the range setting unit 108 sets the range input value Ro as the range setting value R, and outputs it to the range conversion unit 109. Moreover, when having acquired the information indicating to execute the edge enhancement process from the edge enhancement instruction unit 102, the range setting unit 108 sets a maximum luminance Ri (1000%) within the dynamic range of the input image as the range setting value R, and outputs it to the range conversion unit 109. When the range setting value R is set at Ri, the range conversion unit 109 does not substantially execute the range conversion process as described below.

The range setting unit 108 then acquires, from the memory 4, the gradation characteristic of the image after the gradation conversion in the linear conversion unit 106, and determines the gradation threshold X based on the range setting value R. The range setting unit 108 determines the gradation threshold X from the range setting value R based on the gradation characteristic of the image after the gradation conversion in the linear conversion unit 106, the gradation characteristic being illustrated in FIG. 4B. The range setting value R is within the dynamic range of the input image; accordingly, the gradation threshold X is a gradation value within the range of a possible gradation value of the input image. When the range setting value R is 400%, the gradation threshold X is 409 (=400%/1000%×1023).

The range conversion unit 109 converts the gradation value of the input image in such a manner as to display, on the display 2, the gradation value range appropriate to the range setting value R in the input image with a characteristic close to the gradation characteristic of the input image, and generates a display image (output image). In other words, the range conversion unit 109 generates the display image in such a manner as to display, on the display 2, the range appropriate to the range setting value R within the dynamic range of the input image with the characteristic close to the gradation characteristic of the input image.

The range conversion unit 109 extends a gradation value range included in a gradation value range equal to or less than the gradation threshold X appropriate to the range setting value R and reduces a gradation value range included in a gradation value range greater than the gradation threshold X, in the input image, and generates an output image. To put it another way, it also can be said that the range conversion unit 109 performs the process of increasing the gradation property of an area with a gradation value equal to or less than the gradation threshold X, and reducing the gradation property of an area with a gradation value greater than the gradation threshold X, in the input image acquired from the linear conversion unit 106, and generates an output image.

Specifically, the range conversion unit 109 converts a gradation value greater than the gradation threshold X into a predetermined gradation value, and a gradation value equal to or less than the gradation threshold X into a gradation value equal to or less than the predetermined gradation value, in the acquired input image, and generates an output image. The range conversion unit 109 outputs the generated output image to the display control board 5.

Figure 5:
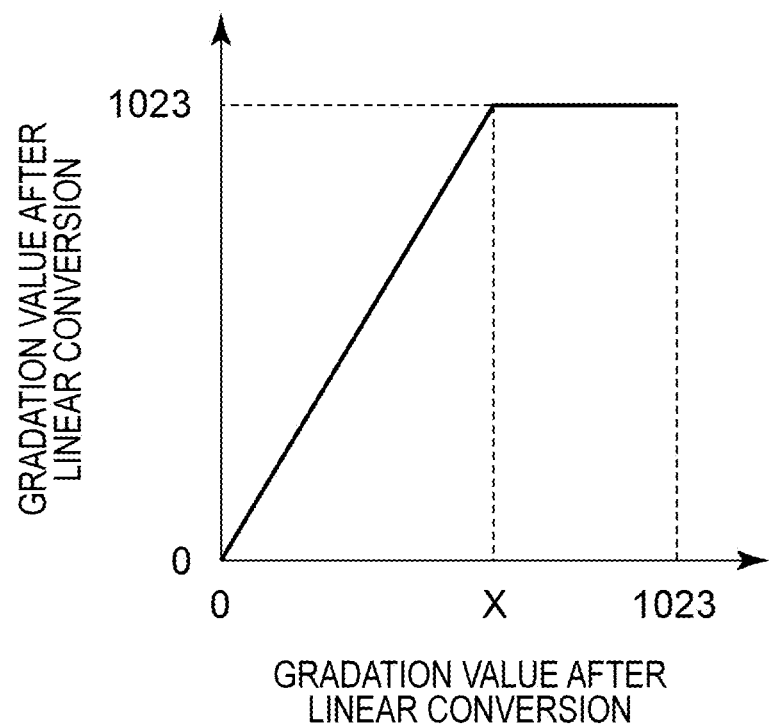
FIG. 5 is a schematic diagram illustrating an LUT used for a gradation conversion of a range conversion unit.

FIG. 5 is a schematic diagram illustrating an LUT used for the gradation conversion in the range conversion unit 109. The horizontal axis of FIG. 5 represents the gradation value of the input image after the conversion process in the linear conversion unit 106, and the vertical axis represents the gradation value of the output image after the conversion process in the range conversion unit 109.

The range conversion unit 109 uses the LUT illustrated in FIG. 5 to perform the gradation conversion process on the input image after the linear conversion. Specifically, the range conversion unit 109 extends the gradation value range included in a range of a minimum possible gradation value of the input image to equal to or less than the gradation threshold X within the gradation value range of the input image after the linear conversion, to a range of a possible gradation value of the output image. Moreover, the range conversion unit 109 converts a gradation value equal to or greater than the gradation threshold X within the gradation value range of the input image after the linear conversion into a maximum possible gradation value of the output image. With this conversion process, the gradation property of an area of the input image with a gradation value equal to or less than the gradation threshold X increases, whereas an area of the input image with a gradation value greater than the gradation threshold X loses the gradation property, and an image has a loss of highlight detail. In other words, it can be said that an area appropriate to a dynamic range that is higher than the range setting value R within the dynamic range of the input image loses the gradation property in the output image, which has a loss of highlight detail. Therefore, the dynamic range of the input image is converted into a dynamic range equal to or less than the range setting value R.

The display control board 5 controls the display to display an image on the display 2 based on the acquired display image.

Figure 7A:
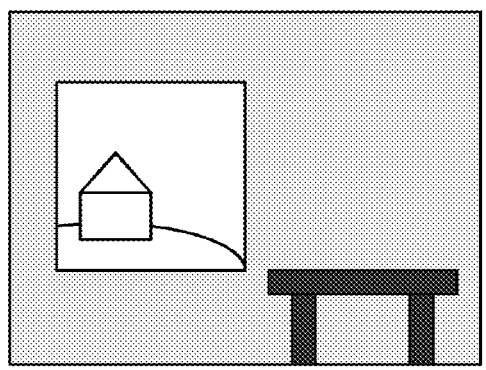
FIGS. 7A to 7D are schematic diagrams illustrating an input image input into the display apparatus in the first example, and images displayed on a display unit based on a display image generated.
Figure 7B:
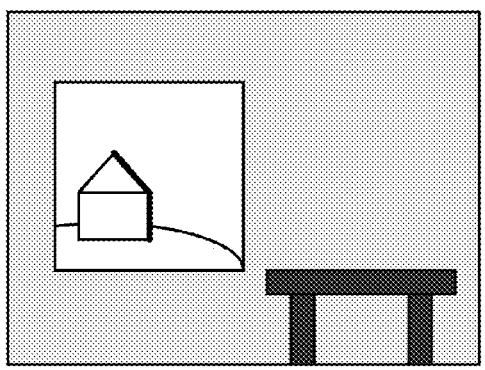

A display image generation flow in the first example is described below with reference to FIGS. 6, 7A to 7D, and 8. FIG. 6 is a flowchart illustrating the display image generation flow in the first example. FIGS. 7A to 7D are schematic diagrams illustrating images in the first example. FIG. 8 is a comparison diagram used to describe the effects of the first example.

When the display image generation flow is started, the input unit 101 acquires an input image from the camera 10 in S1001. FIG. 7A is a schematic diagram of the input image acquired by the input unit 101. In the first example, the input image is an image taken by the camera 10 that shows a bright external view from inside a dark room through a window. A bright area A inside the window is an image including many pixels with brightness at a reflectance of 400% or more. Moreover, an area excluding the area A in the input image is an image including many pixels with brightness at a reflectance of less than 400%. Moreover, it is assumed that the focus is on an object (house B) included in the area A in the input image. The processing proceeds to S1002.

In S1002, the display range acquisition unit 107 acquires the range input value Ro from the operating unit 3, based on the user's operation. Let the acquired range input value Ro be, for example, 400%. The processing proceeds to S1003.

In S1003, the edge enhancement instruction unit 102 judges whether or not the user has instructed to execute the edge enhancement process. If having been instructed to execute the edge enhancement process, the edge enhancement instruction unit 102 outputs the instruction to execute the edge enhancement process to the edge enhancement unit 103. The processing proceeds to S1004. If having not been instructed to execute the edge enhancement process, the edge enhancement instruction unit 102 outputs the instruction not to execute the edge enhancement process to the edge enhancement unit 103. The edge enhancement unit 103 outputs the input image to the linear conversion unit 106. The processing then proceeds to S1006.

In S1004, the edge enhancement unit 103 performs the edge enhancement process on the input image. FIG. 7B illustrates the input image on which the edge enhancement unit 103 has performed the edge enhancement process. When the focus is on the house B, the enhancement process is performed on a part of the house B. In FIG. 7B, a portion of the house B illustrated by a thick line is colored and enhanced. The edge enhancement unit 103 outputs, to the linear conversion unit 106, the input image on which the edge enhancement process has been performed. The processing then proceeds to S1006.

In S1005, the range setting unit 108 sets, as the range setting value R, a maximum possible brightness Ri of the dynamic range appropriate to the input image. As illustrated in FIG. 2, let the maximum possible brightness Ri of the dynamic range appropriate to the input image be, for example, 1000%. The range setting unit 108 outputs the set range setting value R to the range conversion unit 109. The processing then proceeds to S1007.

In S1006, the range setting unit 108 determines the range input value Ro acquired in S1003 as the range setting value R. The range setting unit 108 outputs the set range setting value R to the range conversion unit 109. The processing then proceeds to S1007.

In S1007, the range setting unit 108 sets the gradation threshold X for the range conversion unit 109 based on the acquired range setting value R. If the execution of the edge enhancement process has been instructed, the range setting value R is the maximum possible brightness Ri of the dynamic range appropriate to the input image. Therefore, the range setting unit 108 sets the gradation threshold X as a maximum possible gradation value, 1023, of the output image. In other words, the clipping process is not substantially executed. On the other hand, if the execution of the edge enhancement process has not been instructed, the range setting value R is the range input value Ro. Therefore, the range setting unit 108 sets the gradation threshold X at 409. The processing then proceeds to S1008.

In S1008, the linear conversion unit 106 performs the gradation conversion process on the input image on which the edge enhancement process has been performed, using the LUT illustrated in FIG. 4A. The linear conversion unit 106 outputs, to the range conversion unit 109, the input image on which the gradation conversion process has been performed. The processing proceeds to S1007.

In S1009, the range conversion unit 109 performs the gradation conversion process on the input image acquired from the linear conversion unit 106, using the set gradation threshold X, and generates an output image.

Figure 7C:
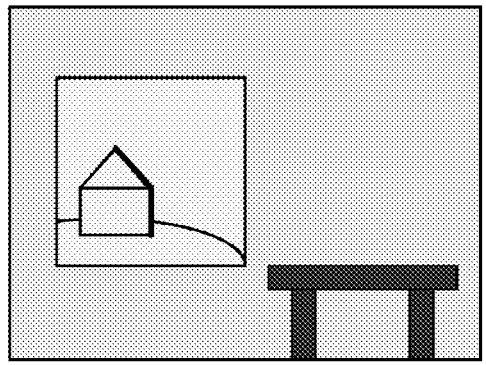
Figure 8:
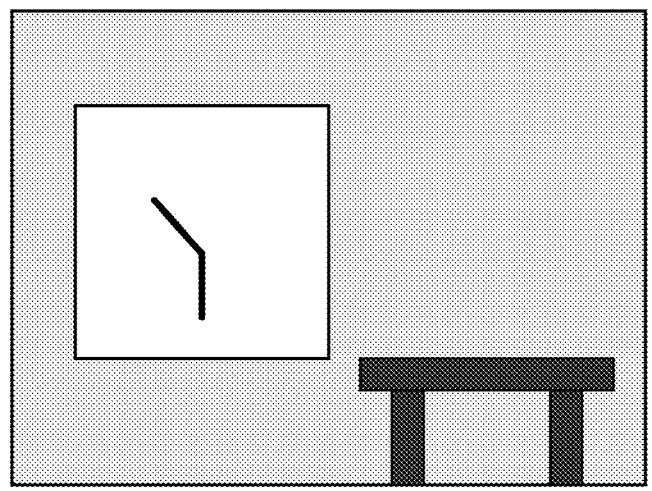
FIG. 8 is a schematic diagram illustrating a comparative example with the first example.

FIG. 7C is a schematic diagram of an image displayed on the display 2 based on an output image that is generated if the execution of the edge enhancement process is instructed. In this case, a maximum gradation value corresponding to the maximum brightness (1000%) of the dynamic range of the input image is converted into a maximum possible gradation value of the output image. The maximum gradation value of the output image is then displayed at a brightness of 400% on the display 2. To put is another way, it also can be said that the input image having a dynamic range of up to 1000% is compressed to a dynamic range of up to 400%.

Therefore, the image displayed on the display 2 is a darker image than the dynamic range of the input image. However, a reduction in visibility near the edge area in the area A is prevented since clipping is prevented from occurring in the image as a result of the clipping process.

Figure 7D:
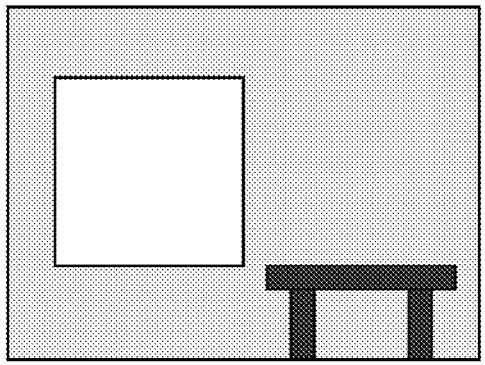

FIG. 7D is a schematic diagram of an image displayed on the display 2 based on an output image that is generated if the edge enhancement process is instructed not to be executed. In this case, a gradation value corresponding to a brightness equal to or less than the range input value Ro within the dynamic range of the input image is converted into a range of a possible gradation value of the output image. Moreover, a gradation value corresponding to a brighter area than the range input value Ro within the dynamic range of the input image is converted into a maximum possible gradation value of the output image.

Therefore, the area of the input image, excluding the area A and corresponding to a brightness equal to or less than the range input value Ro, is displayed in the dynamic range of the output image on the display 2. On the other hand, the area A of the input image, corresponding to a brightness greater than the range input value Ro, loses the gradation property, and is displayed as a white image on the display 2.

FIG. 8 is a schematic diagram illustrating an image displayed on the display 2 based on an output image that is generated with the range input value Ro as the range setting value R if the execution of the edge enhancement process is instructed. In this case, the above-mentioned clipping process is performed on the edge area of the house in the area A after the edge enhancement process. Accordingly, a portion except for the edge area of the area A is converted into a white image. Therefore, only the edge area is displayed in the area A on the display 2. The user cannot see the surroundings of the edge area.

According to the image processing board 100 of the first example, the range setting unit 108 sets the gradation threshold X at a maximum possible gradation value of an input image if the edge enhancement process has been performed on the input image. The range conversion unit 109 then performs the gradation conversion process on the input image on which the edge enhancement process has been performed, and generates a display image. Consequently, the visibility of the edge area on which the enhancement process has been performed and the surrounding area of the edge area is adjusted, which allows the user to easily adjust the focus.

When the edge enhancement process is executed in the first example, the gradation threshold X is set at a gradation value corresponding to the maximum luminance Ri within the dynamic range of an input image. However, control may be performed such that the gradation conversion process (clipping process) of the range conversion unit 109 is not executed. Assume that, for example, the image processing board 100 includes a first processing mode that converts the dynamic range of an input image into a specified display range and generates an output image, and a second processing mode that generates an output image such that the dynamic range of the input image becomes the dynamic range of the output image. Assume that the image processing board 100 generates an output image in first processing mode when the edge enhancement process has not been executed on the input image, and generates an output image in second processing mode when the edge enhancement process has been executed on the input image. Also in this case, as in the above-mentioned processing of the image processing board 100, the visibility of the edge area on which the enhancement process has been performed and the surrounding area of the edge area is adjusted, which allows the user to easily adjust the focus.

The process of enhancing an input image may be one other than the process of enhancing the edge area. For example, it may be a process of coloring and enhancing an object specified in the input image. Moreover, it may be a process of superimposing, on an image, a frame or icon indicating an object specified in the input image to allow attention to be drawn to the object. The edge enhancement process includes a process of enhancing an area that satisfies a predetermined condition in the input image.

Second Example

An image processing apparatus in a second example sets the gradation threshold for a case where the edge enhancement process is executed, based on the brightness distribution of an input image to adjust the visibility of a surrounding area of an edge area and prevent a reduction in the brightness of an image to be displayed.

A display apparatus 1 in the second example includes a display 2, an operating unit 3, a memory 4, a display control board 5, and an image processing board 200. The apparatus configuration of the display apparatus 1 is similar to that of the first example. Accordingly, the apparatus configuration diagram is omitted. Moreover, the elements other than the image processing board 200 are also similar to those of the first example. Accordingly, their descriptions are omitted.

The image processing board 200 is an image processing apparatus that performs the clipping process on an input image, using a gradation threshold appropriate to a display range specified by a user, and generates an output image. When the user has instructed to execute the edge enhancement process, the image processing board 200 performs the enhancement process on an edge area of the input image, and sets the gradation threshold based on the brightness distribution of the input image such that at least a gradation value of a surrounding area of the edge area becomes equal to or less than the gradation threshold. Consequently, the gradation value of the surrounding area of the edge area is converted into a predetermined gradation value to prevent clipping from occurring in the image.

Figure 9:
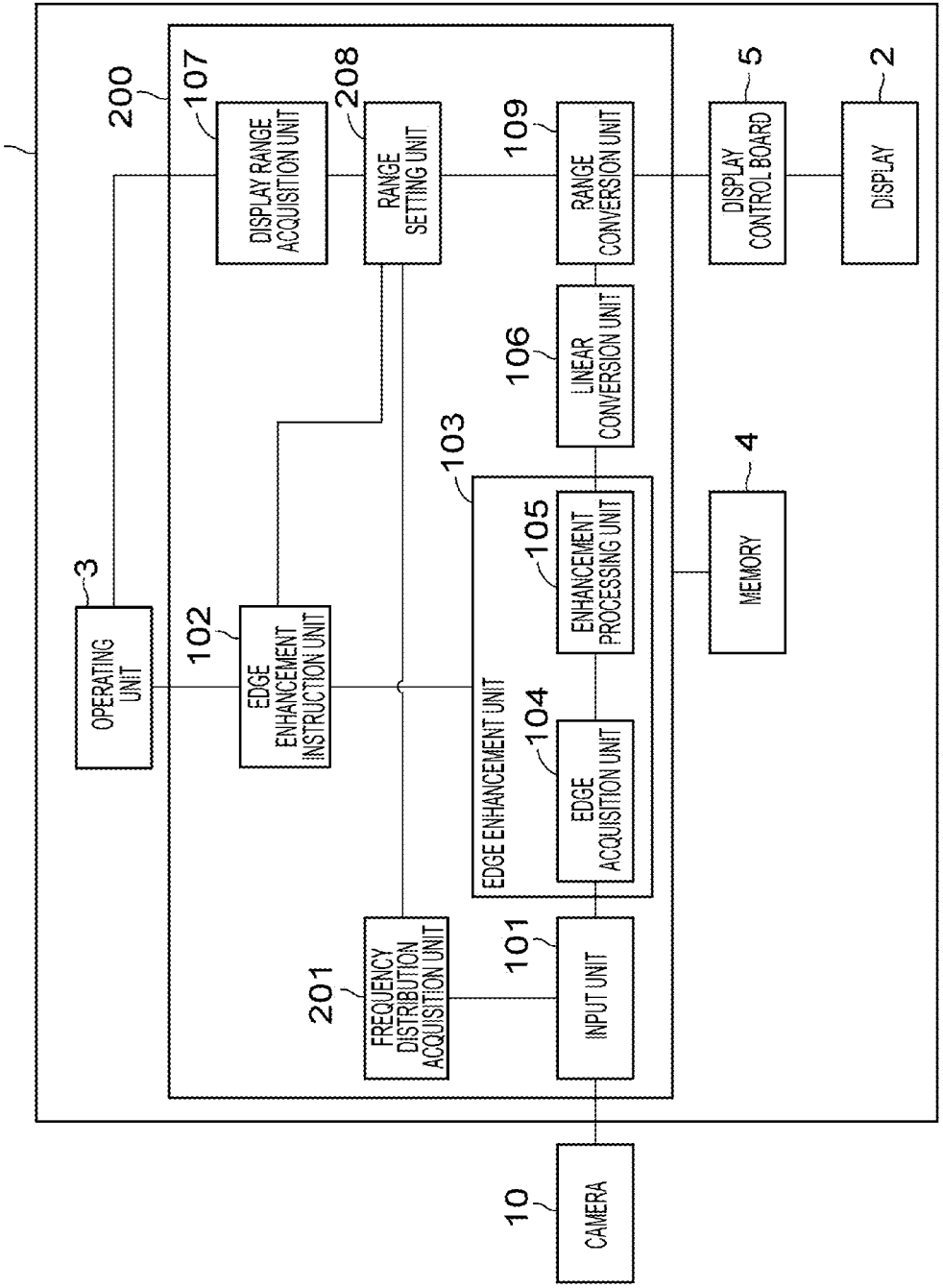
FIG. 9 is a block diagram illustrating function blocks of a display apparatus and a camera in a second example.

FIG. 9 is a block diagram illustrating function blocks of the display apparatus 1 and a camera 10 in the second example. The image processing board 200 includes an input unit 101, an edge enhancement instruction unit 102, an edge enhancement unit 103, a linear conversion unit 106, a display range acquisition unit 107, a range conversion unit 109, a frequency distribution acquisition unit 201, and a range setting unit 208. The function blocks to which the same names and reference numerals as those of the first example are assigned exhibit similar functions to those of the first example. Accordingly, their descriptions are omitted.

The frequency distribution acquisition unit 201 acquires a maximum brightness included in the input image, and outputs it to the range setting unit 208. The frequency distribution acquisition unit 201 acquires the input image from the input unit 101, and acquires the distribution of frequency with respect to brightness.

Figure 10:
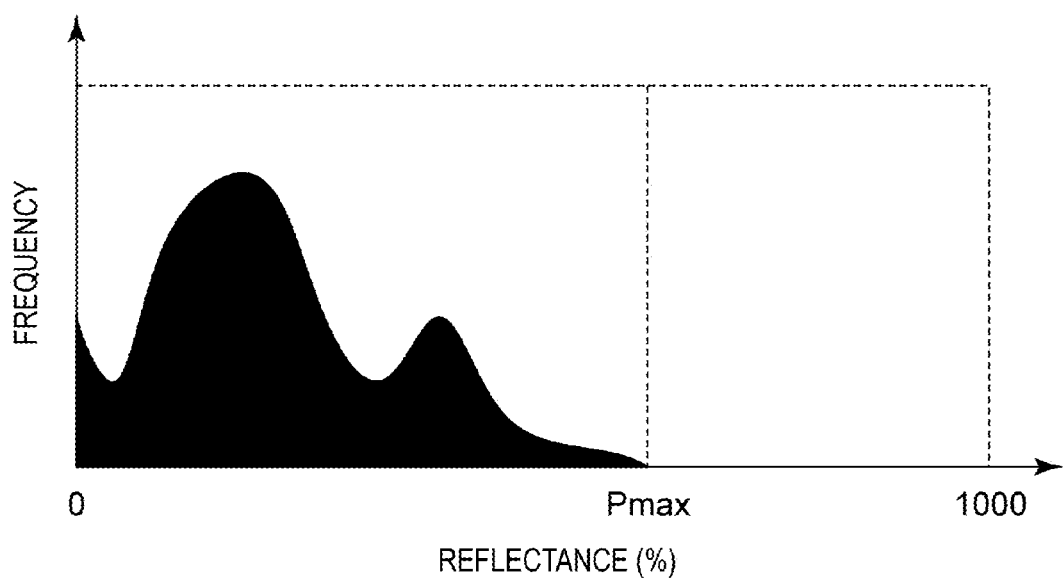
FIG. 10 is a schematic diagram illustrating the distribution of frequency with respect to the brightness of an input image acquired by a frequency distribution acquisition unit.

FIG. 10 is a schematic diagram illustrating the distribution of frequency with respect to the brightness of the input image acquired by the frequency distribution acquisition unit 201. The frequency distribution acquisition unit 201 acquires the frequency distribution of gradation values of the input image, and further converts the acquired frequency distribution of the gradation values based on the gradation characteristic of the input image acquired from the memory 4 to acquire the frequency distribution with respect to brightness. The frequency distribution acquisition unit 201 acquires a maximum brightness Pmax included in the input image from the acquired frequency distribution of brightness. Let Pmax be, for example, 600%. The gradation values of the input image may be compared to set a brightness corresponding to the largest gradation value as Pmax.

If the edge enhancement process has been performed based on the acquired information, the range setting unit 208 determines the range setting value R in such a manner as not to lose the gradation property of the surrounding area of the edge area. Moreover, the range setting unit 208 sets the gradation threshold X for the range conversion unit 109 based on the determined range setting value R.

The range setting unit 208 acquires an instruction indicating whether or not to execute the edge enhancement process, from the edge enhancement instruction unit 102. Moreover, the range setting unit 208 acquires the range input value Ro input by the user, from the display range acquisition unit 107. Let the range input value Ro be, for example, 400%. Furthermore, the range setting unit 208 acquires Pmax from the frequency distribution acquisition unit 201.

If having acquired the instruction to execute the edge enhancement process from the edge enhancement instruction unit 102, the range setting unit 208 compares Pmax and the range input value Ro to determine the range setting value R. The range setting unit 208 determines Pmax as the range setting value R if Pmax is greater than Ro, and determines the range input value Ro as the range setting value R if Pmax is equal to or less than the range input value Ro. The value that is determined by the range setting unit 208 to be the range setting value R if Pmax is greater than the range input value Ro is to be equal to or greater than Pmax. Moreover, the range setting unit 208 determines the range input value Ro as the range setting value R if having acquired the instruction not to execute the edge enhancement process from the edge enhancement instruction unit 102.

The range setting unit 208 then determines the gradation threshold X based on the determined range setting value R, and sets it for the range conversion unit 109. In other words, the range setting unit 208 determines a value equal to or greater than a gradation value corresponding to Pmax as the gradation threshold X, and sets it for the range conversion unit 109.

Figure 11:
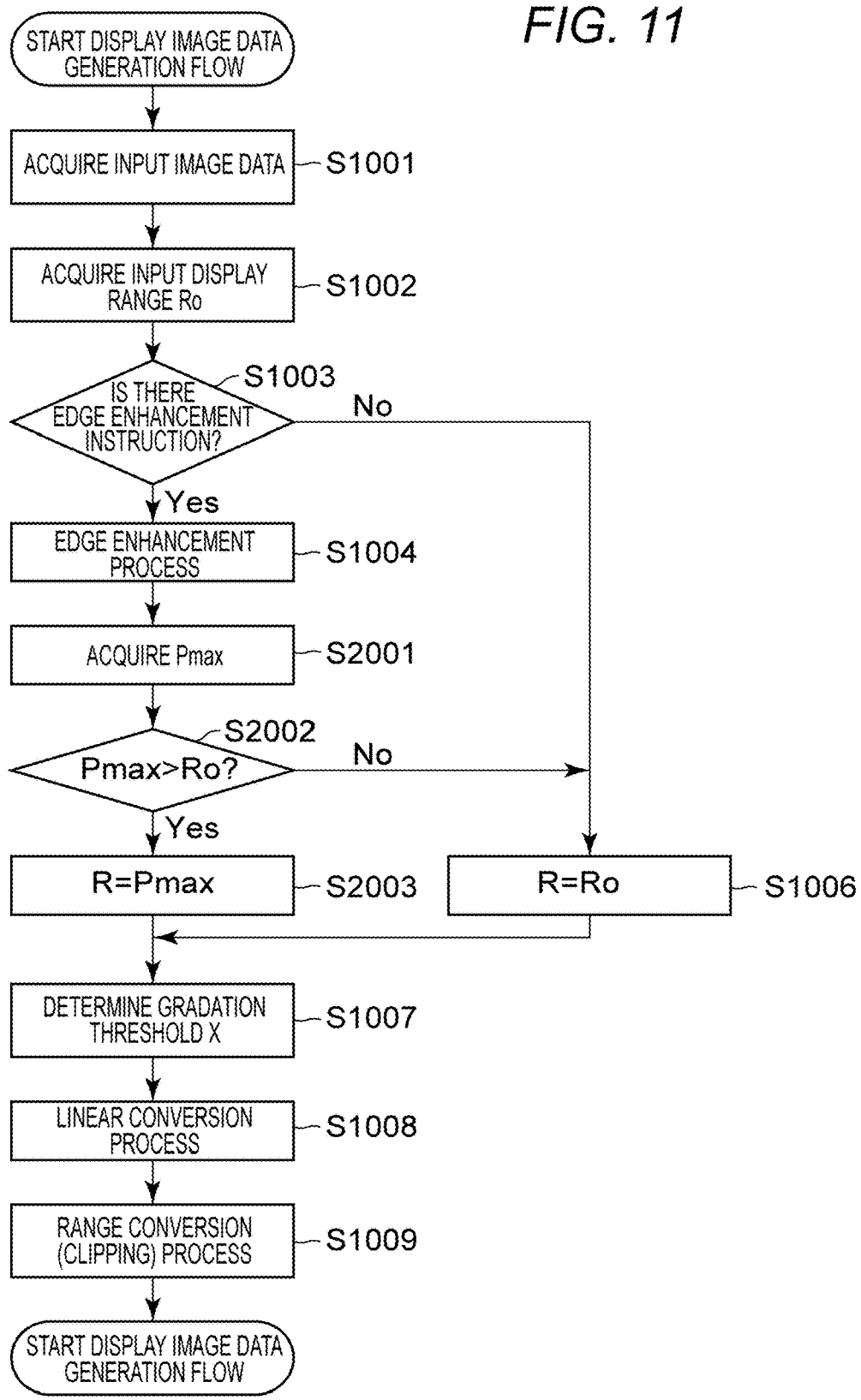
FIG. 11 is a second flowchart illustrating the display image generation flow of the range setting unit.

FIG. 11 is a flowchart illustrating a display image generation flow of the image processing board 200 in the second example. The steps with the same names to which the same reference numerals as those in the first example are assigned are processes that execute the same processes. Accordingly, their descriptions are omitted.

In S2001, the frequency distribution acquisition unit 201 acquires the maximum brightness Pmax included in the input image. The frequency distribution acquisition unit 201 outputs the acquired Pmax to the range setting unit 208. The processing proceeds to S2002.

In S2002, the range setting unit 208 determines whether or not Pmax is greater than the range input value Ro. If Pmax is equal to or less than the range input value Ro, the processing proceeds to S1006. If Pmax is greater than the range input value Ro, the processing proceeds to S2003.

In S2003, the range setting unit 208 determines Pmax as the range setting value R. The processing proceeds to S1007.

According to the image processing apparatus described in the second example, when the edge enhancement process is performed on an input image, the conversion process is performed, setting, as the gradation threshold X, a gradation value corresponding to the maximum brightness Pmax included in the input image. Therefore, it becomes possible to prevent clipping from occurring in the image and prevent a reduction in the visibility of the entire display image including a surrounding area of an edge area, when the input image on which the edge enhancement process has been performed is converted into an output image.

Furthermore, in the second example, it becomes possible to reduce the gradation threshold X when the edge enhancement process is performed on an input image as compared to when the gradation threshold X is set at a maximum possible gradation value of the input image. Therefore, it becomes possible to prevent an image displayed from becoming dark when the image is displayed on the display 2 based on an output image obtained by converting the input image.

In the second example, the frequency distribution acquisition unit 201 acquires the maximum brightness Pmax included in the input image. However, the frequency distribution acquisition unit 201 may acquire and output a maximum gradation value included in the input image. In this case, the range setting unit 208 sets the range setting value R in such a manner as to be equal to or greater than the acquired maximum gradation value included in the input image.

Third Example

An image processing apparatus in a third example sets a gradation threshold for a case where the edge enhancement process is executed based on the distribution of brightness of a surrounding area of an edge area of an input image to adjust the visibility of the surrounding area of the edge area.

A display apparatus 1 in the third example includes a display 2, an operating unit 3, a memory 4, a display control board 5, and an image processing board 300. The apparatus configuration of the display apparatus 1 is similar to that of the first example. Accordingly, the apparatus configuration diagram is omitted. Moreover, the elements other than the image processing board 300 are also similar to those of the first example. Accordingly, their descriptions are omitted.

The image processing board 300 is an image processing apparatus that performs the clipping process, using a gradation threshold appropriate to a display range specified by a user based on an input image, and generates an output image. When the user has instructed to execute the edge enhancement process, the image processing board 300 performs the enhancement process on the edge area of the input image. Furthermore, the image processing board 300 sets the gradation threshold X, based on the distribution of brightness of the surrounding area of the edge area of the input image, such that a gradation value of the surrounding area of the edge area is equal to or less than the gradation threshold. Consequently, the gradation value of the surrounding area of the edge area is converted into a predetermined gradation value to prevent clipping from occurring in the image.

Figure 12:
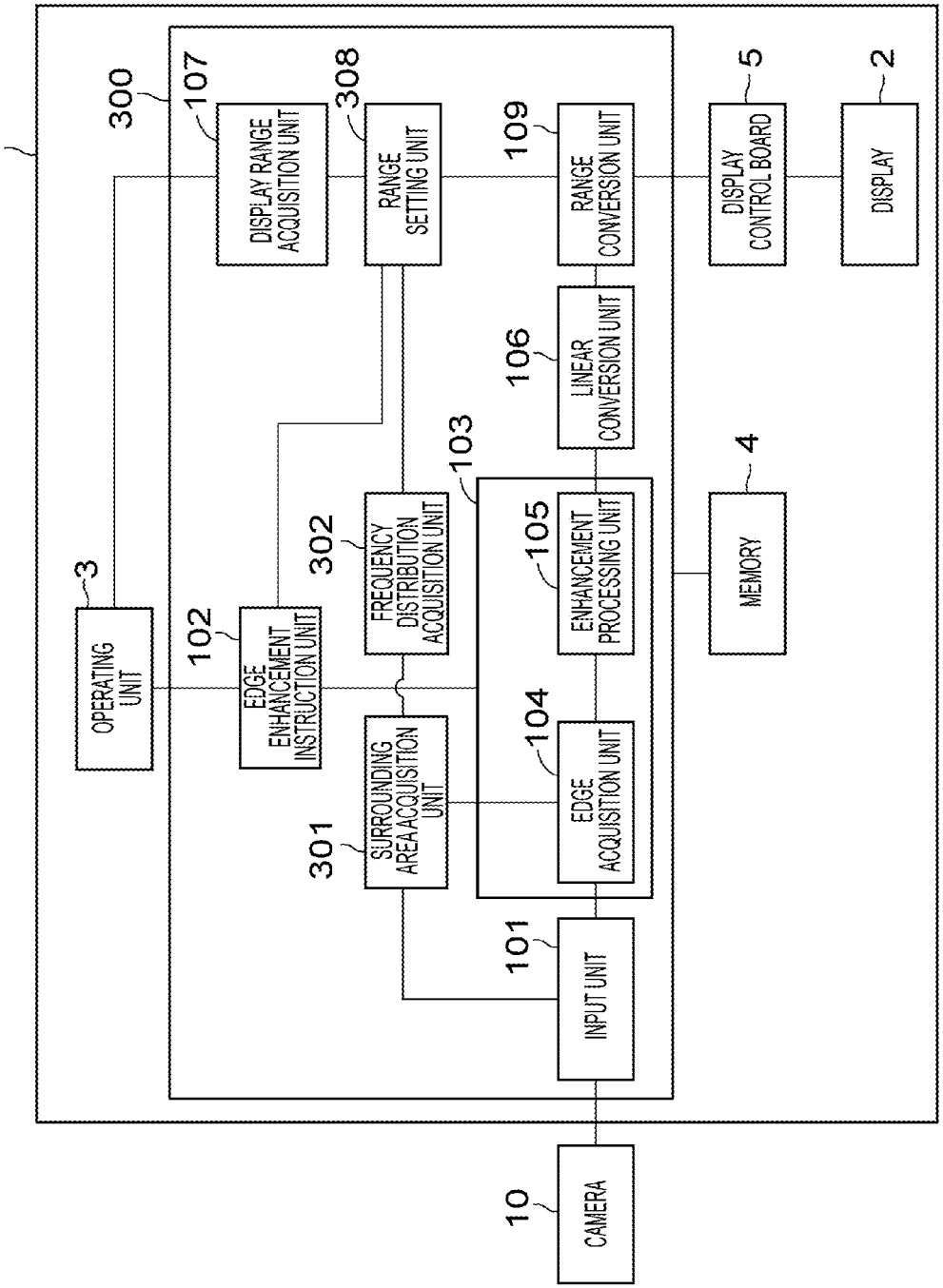
FIG. 12 is a block diagram illustrating function blocks of a display apparatus and a camera in a third example.

FIG. 12 is a block diagram illustrating function blocks of the display apparatus 1 in the third example. The function blocks to which the same names and reference numerals as those of the first example are assigned exhibit similar functions to those of the first example. Accordingly, their descriptions are omitted. The image processing board 300 includes an input unit 101, an edge enhancement instruction unit 102, an edge enhancement unit 103, a linear conversion unit 106, a display range acquisition unit 107, a range conversion unit 109, a surrounding area acquisition unit 301, a frequency distribution acquisition unit 302, and a range setting unit 308.

The surrounding area acquisition unit 301 acquires information on a surrounding area of an edge area of an input image. The surrounding area acquisition unit 301 acquires the information on the edge area from the edge acquisition unit 104. The surrounding area acquisition unit 301 identifies the position of the surrounding area of the edge area of the input image, and outputs the position information of the surrounding area and the input image to the frequency distribution acquisition unit 302.

The surrounding area acquisition unit 301 specifies an area included in a predetermined number of pixels as the surrounding area for the acquired edge area. The predetermined number of pixels is to be, for example, the number of pixels where the user can easily and visually recognize an object on the display 2. Moreover, the predetermined number of pixels may change depending on the size of the edge area. The predetermined number of pixels may be increased with, for example, increasing size of a corresponding edge area.

The frequency distribution acquisition unit 302 acquires a maximum brightness Ps_max included in the surrounding area of the edge area based on the input image acquired from the surrounding area acquisition unit 301 and the information on the surrounding area of the edge area. The frequency distribution acquisition unit 302 generates the frequency distribution of gradation values of the surrounding area of the edge area from the input image based on the information indicating the position of the surrounding area of the edge area.

The frequency distribution acquisition unit 302 uses the generated frequency distribution of the gradation values of the surrounding area of the edge area, and the information on the relationship of the input image between the gradation value and the brightness, the information having been acquired from the memory 4, to acquire the maximum brightness Ps_max included in the surrounding area of the edge area. Ps_max also can be acquired by directly comparing the gradation values included in the surrounding area of the edge area in the input image and obtaining a maximum gradation value, without being acquired from the frequency distribution. The frequency distribution acquisition unit 302 outputs the acquired Ps_max to the range setting unit 308.

The range setting unit 308 determines the range setting value R based on the acquired information in such a manner as not to lose the gradation property of the surrounding area of the edge area when the edge enhancement process is performed.

The range setting unit 308 acquires an instruction indicating whether or not to execute the edge enhancement process, from the edge enhancement instruction unit 102. Moreover, the range setting unit 308 acquires the range input value Ro input by the user from the display range acquisition unit 107. Let the range input value Ro be, for example, 400%. Furthermore, the range setting unit 308 acquires Ps_max from the frequency distribution acquisition unit 302.

When having acquired the instruction to execute the edge enhancement process from the edge enhancement instruction unit 102, the range setting unit 308 compares Ps_max and the range input value Ro and determines the range setting value R. The range setting unit 308 sets Ps_max as the range setting value R if Ps_max is greater than Ro, and sets Ro as the range setting value R if Ps_max is equal to or less than Ro. The value that is set by the range setting unit 308 as the range setting value R if Ps_max is greater than Ro is to be equal to or greater than Ps_max. Moreover, the range setting unit 308 determines the range input value Ro as the range setting value R when having acquired the instruction not to execute the edge enhancement process from the edge enhancement instruction unit 102.

The range setting unit 308 then determines the gradation threshold X based on the set range setting value R, and outputs it to the range conversion unit 109. The range setting unit 308 outputs a value equal to or greater than a gradation value corresponding to Ps_max, as the gradation threshold X, to the range conversion unit 109.

Figure 13:
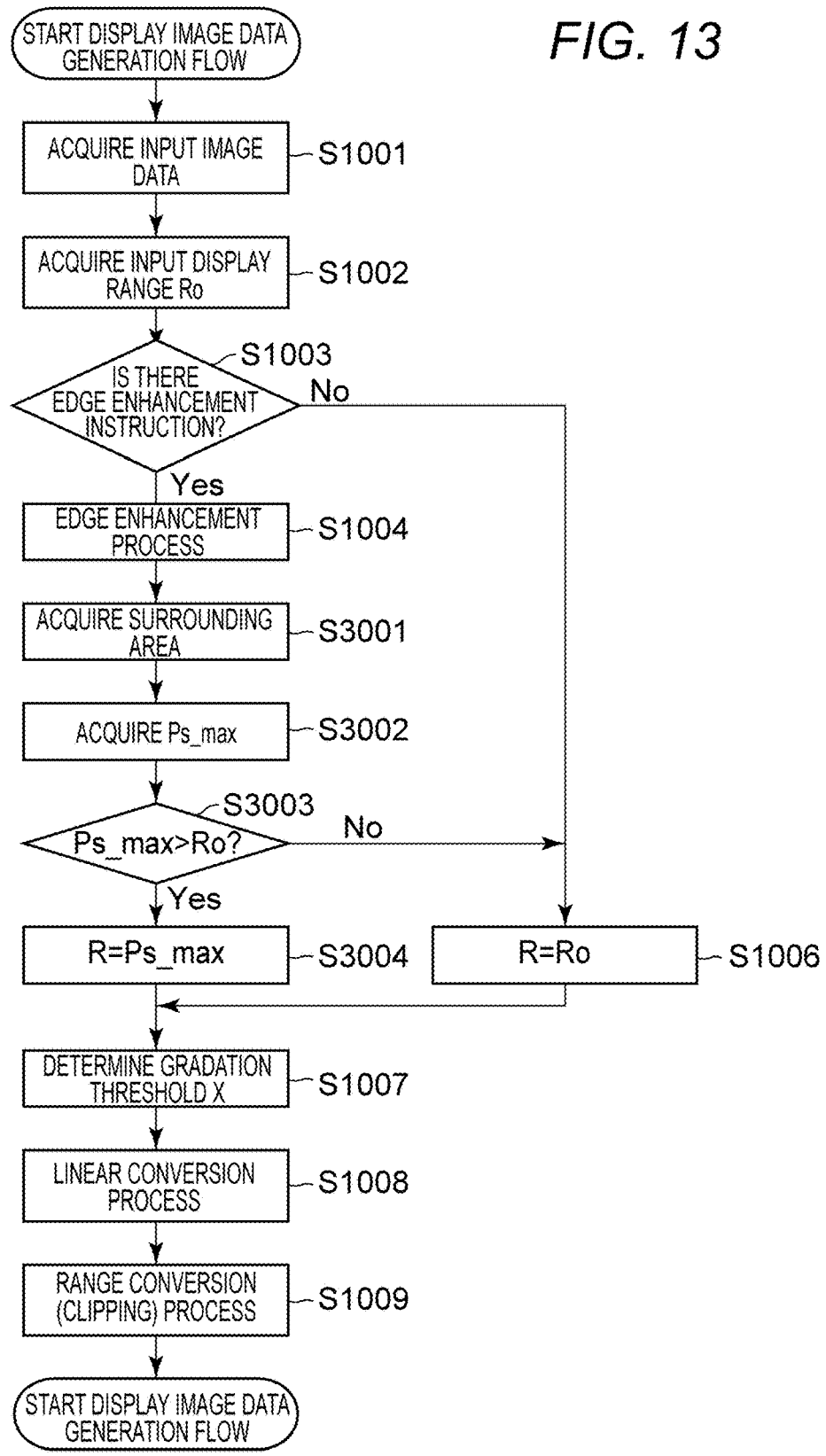
FIG. 13 is a third flowchart illustrating the display image generation flow of the range setting unit.

FIG. 13 is a flowchart illustrating a display image generation flow of the image processing board 300 in the third example. The steps with the same names to which the same reference numerals as those of the first example are assigned are processes that execute the same processes. Accordingly, their descriptions are omitted.

In S3001, the surrounding area acquisition unit 301 uses the input image acquired from the input unit 101 and the edge area information acquired from the edge acquisition unit to acquire information indicating the surrounding area of the edge. Specifically, the surrounding area acquisition unit 301 acquires the position of the surrounding area of the edge, or area information indicating bounds. The surrounding area acquisition unit 301 then outputs, to the frequency distribution acquisition unit 302, the input image and the information indicating the surrounding area of the edge. The processing proceeds to S3002.

In S3002, the frequency distribution acquisition unit 302 uses the acquired input image and information indicating the surrounding area of the edge to generate the frequency distribution of gradation values of the surrounding area of the edge, and acquires the maximum brightness Ps_max of the surrounding are of the edge. The frequency distribution acquisition unit 302 outputs Ps_max to the range setting unit 308. The processing proceeds to S3003.

In S3003, the range setting unit 308 determines whether or not Ps_max is greater than the range input value Ro. If Ps_max is equal to or less than the range input value Ro, the processing proceeds to S1007. Moreover, if Ps_max is greater than the range input value Ro, the processing proceeds to S3004.

In S3004, the range setting unit 308 determines Ps_max as the range setting value R. The processing proceeds to S1008.

According to the image processing apparatus described in the third example, the conversion process is performed using, as the gradation threshold, a gradation value corresponding to a maximum brightness included in a surrounding area of an edge area of an input image, when the edge enhancement process is performed on the input image. Therefore, at least the surrounding area of the edge area in the input image on which the edge enhancement process has been performed is displayed on the display 2 without being clipped. Therefore, it becomes possible to prevent a reduction in the visibility of the surrounding area of the edge area.

In the third example, the range setting value R for the case where the edge enhancement process is performed on the input image is set at the maximum brightness value Ps_max of the surrounding area of the edge area. However, the range setting value R is to be a value equal to or greater than Ps_max. The range setting value R may be set at, for example, the maximum possible brightness Ri of the input image as in the first example.

Moreover, the image processing board 300 is not limited to the one that uses the same range setting value R for the entire input image and generates a display image. It also is possible for the image processing board 300 to perform the gradation conversion on the acquired surrounding area of the edge area, using the range setting value R determined as described in the third example, and perform the gradation conversion on the remaining area using the range input value Ro. Consequently, at least the surrounding area of the edge area can be displayed without being clipped due to the gradation conversion process.

The frequency distribution acquisition unit 302 acquires the maximum brightness Ps_max included in the surrounding area of the edge area, but may acquire and output a maximum gradation value included in the surrounding area of the edge area. In this case, the range setting unit 208 sets the range setting value R to be equal to or greater than the acquired maximum gradation value included in the surrounding area of the edge area.

Other Examples

In the first to third examples, the image processing apparatus is described as the image processing boards 100, 200, and 300 provided in the display apparatus 1. However, the image processing apparatus may be an apparatus different from the display 2. A personal computer or a single image processing apparatus may exhibit similar functions to any of the image processing boards 100, 200, and 300 of the first to third examples.

Moreover, the image processing apparatus may be an image processing apparatus that can be connected to an imaging apparatus that can perform the edge enhancement process on an image and output the image. In this case, the imaging apparatus outputs, to the image processing apparatus, the image, information indicating whether or not the image is an edge-enhanced image on which the edge enhancement process has been performed, and information on an edge area. The image processing apparatus can also perform a similar gradation conversion process to that of the image processing apparatuses illustrated in the first to third examples and generate a display image.

Moreover, the image processing apparatus can also perform the above-mentioned processing on an input image where a gradation value is not associated with luminance displayed on the display apparatus, and generate an output image. In this case, the image processing apparatus uses a gradation threshold determined in accordance with a gradation range indicating a gradation value range to be extended within a range of a possible gradation value of the input image, the range having been specified by a user, converts the input image, and generates an output image.

When the user has instructed to perform the edge enhancement process, the image processing apparatus sets the gradation threshold such that at least a gradation value of a surrounding area of an edge area becomes equal to or less than the gradation threshold. At this point in time, the image processing apparatus sets, as the gradation threshold, a gradation value equal to or greater than at least a maximum gradation value of the surrounding area of the edge area. In other words, the image processing apparatus sets, as the gradation threshold, one equal to or greater than any of a maximum gradation value of possible gradation values of the output image, a gradation value of the output image corresponding to a maximum gradation value of the input image, and a maximum gradation value of gradation values around the edge area.

Moreover, the image processing apparatus is to narrow the range of a gradation value greater than the gradation threshold among the gradation values of the input image. For example, the image processing apparatus may convert a gradation value such that a ratio of the converted range to a range of a possible gradation value of the output image becomes smaller than a ratio of the range of a gradation value greater than the gradation threshold to a range of a possible gradation value of the input image. Also in this case, the processing illustrated in the first to third examples is executed; accordingly, it becomes possible to prevent a reduction in the visibility of at least a surrounding area of an edge area.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that aspects of the invention are not limited to the disclosed embodiments. The scope of the following claims is to be accorded the broadest interpretation so as to encompass all such modifications and equivalent structures and functions.

This application claims the benefit of Japanese Patent Application No. 2016-072974, filed Mar. 31, 2016, which is hereby incorporated by reference herein in its entirety.

What is claimed is:

1. An image processing apparatus comprising:
one or more processors; and
memory storing instructions that, when executed by the one or more processors, cause the image processing apparatus to function as:
a processing unit configured to enhance a predetermined area of an input image,
a setting unit configured to set a gradation threshold based on whether the processing unit enhances the predetermined area of the input image, and
a conversion unit configured to convert a gradation value greater than the gradation threshold in the input image into a predetermined gradation value, and convert a gradation value equal to or less than the gradation threshold in the input image into a gradation value equal to or less than the predetermined gradation value,
wherein, in a case where the processing unit does not enhance the predetermined area of the input image, the setting unit sets the gradation threshold to a first value based on an output range, and
wherein, in a case where the processing unit enhances the predetermined area of the input image and a gradation value of a surrounding area of the predetermined area of the input image is greater than the first value, the setting unit sets the gradation threshold to a second value being more than the first value.

2. The image processing apparatus according to claim 1, wherein the predetermined area is an edge area in the input image.

3. The image processing apparatus according to claim 1, wherein the predetermined gradation value is a maximum possible gradation value of the output image.

4. The image processing apparatus according to claim 1, wherein the second value is equal to or greater than a maximum gradation value of the surrounding area of the predetermined area of the input image.

5. The image processing apparatus according to claim 1, wherein the second value is a maximum gradation value of gradation values of the input image.

6. The image processing apparatus according to claim 1, wherein a gradation value of the input image is associated with information indicating brightness, and
wherein the setting unit sets the gradation threshold in accordance with a specified display range.

7. The image processing apparatus according to claim 6, wherein the second value is a gradation value corresponding to a brightness equal to or greater than a maximum brightness value of the surrounding area of the predetermined area.

8. The image processing apparatus according to claim 6, wherein the second value is a gradation value corresponding to a maximum brightness value of the input image.

9. An image processing apparatus comprising:
one or more processors; and
memory storing instructions that, when executed by the one or more processors, cause the image processing apparatus to function as:
a processing unit configured to enhance a predetermined area of an input image, and
a conversion unit configured to convert a gradation value greater than the gradation threshold in the input image into a predetermined gradation value, and convert a gradation value equal to or less than the gradation threshold in the input image into a gradation value equal to or less than the predetermined gradation value,
wherein, in a case where processing unit does not enhance the predetermined area of the input image, the conversion unit performs the converting, and
wherein, in a case where the processing unit enhances the predetermined area of the input image, the conversion unit does not perform the converting.

10. A method for an image processing apparatus configured to enhance a predetermined area of an input image
setting a gradation threshold based on whether the predetermined area of the input image is enhanced; and converting a gradation value greater than the gradation threshold in the input image into a predetermined gradation value, and converting a gradation value equal to or less than the gradation threshold in the input image into a gradation value equal to or less than the predetermined gradation value, wherein, in a case where the predetermined area of the input image is not enhanced, setting includes setting the gradation threshold to a first value based on an output range, and wherein, in a case where the predetermined area of the input image is enhanced and a gradation value of a surrounding area of the predetermined area of the input image is greater than the first value, setting includes setting the gradation threshold to a second value being more than the first value.

11. A method for an image processing apparatus configured to enhance a predetermined area of an input image, the method comprising:

converting a gradation value greater than the gradation threshold in the input image into a predetermined gradation value, and converting a gradation value equal to or less than the gradation threshold in the input image into a gradation value equal to or less than the predetermined gradation value, wherein, in a case where the predetermined area of the input image is not enhanced, converting includes performing the converting, and wherein, in a case where the predetermined area of the input image is enhance, converting includes not performing the converting.

12. A non-transitory computer-readable storage medium storing a program to cause an image processing apparatus, configured to enhance a predetermined area of an input image, to perform a method, the method comprising:

setting a gradation threshold based on whether the predetermined area of the input image is enhanced; and converting a gradation value greater than the gradation threshold in the input image into a predetermined gradation value, and converting a gradation value equal to or less than the gradation threshold in the input image into a gradation value equal to or less than the predetermined gradation value, wherein, in a case where the predetermined area of the input image is not enhanced, setting includes setting the gradation threshold to a first value based on an output range, and wherein, in a case where the predetermined area of the input image is enhanced and a gradation value of a surrounding area of the predetermined area of the input image is greater than the first value, setting includes setting the gradation threshold to a second value being more than the first value.

13. A non-transitory computer-readable storage medium storing a program to cause an image processing apparatus, configured to enhance a predetermined area of an input image, to perform a method, the method comprising:

converting a gradation value greater than the gradation threshold in the input image into a predetermined gradation value, and converting a gradation value equal to or less than the gradation threshold in the input image into a gradation value equal to or less than the predetermined gradation value, wherein, in a case where the predetermined area of the input image is not enhanced, converting includes performing the converting, and wherein, in a case where the predetermined area of the input image is enhance, converting includes not performing the converting.

* * * * *